US012372224B2

(12) United States Patent
Yang et al.

(10) Patent No.: US 12,372,224 B2
(45) Date of Patent: Jul. 29, 2025

(54) MAGNETIC CONDUCTIVE TRACK AND LIGHTING DEVICE

(71) Applicants: OPPLE LIGHTING CO., LTD., Shanghai (CN); SUZHOU OPPLE LIGHTING CO., LTD., Suzhou (CN)

(72) Inventors: Tao Yang, Shanghai (CN); Jianmin Xie, Shanghai (CN)

(73) Assignees: OPPLE LIGHTING CO., LTD., Shanghai (CN); SUZHOU OPPLE LIGHTING CO., LTD., Suzhou (CN)

( * ) Notice: Subject to any disclaimer, the term of this patent is extended or adjusted under 35 U.S.C. 154(b) by 42 days.

(21) Appl. No.: 18/378,755

(22) Filed: Oct. 11, 2023

(65) Prior Publication Data

US 2024/0044477 A1 Feb. 8, 2024

Related U.S. Application Data

(63) Continuation of application No. PCT/CN2022/087669, filed on Apr. 19, 2022.

(30) Foreign Application Priority Data

Apr. 25, 2021 (CN) ......................... 202110450099.5

(51) Int. Cl.
*F21V 21/005* (2006.01)
*F21S 8/00* (2006.01)
(Continued)

(52) U.S. Cl.
CPC ............ *F21V 21/005* (2013.01); *F21S 8/038* (2013.01); *F21V 21/096* (2013.01); *F21V 23/06* (2013.01); *F21Y 2103/20* (2016.08)

(58) Field of Classification Search
CPC ...................................................... F21V 21/096
See application file for complete search history.

(56) References Cited

U.S. PATENT DOCUMENTS 5,154,509 A * 10/1992 Wulfman ............. H01R 25/147 362/648
5,342,204 A * 8/1994 Och ....................... H01R 25/14 174/117 A (Continued)

FOREIGN PATENT DOCUMENTS

CN 205897042 U 1/2017
CN 110778995 A 2/2020

(Continued)

OTHER PUBLICATIONS

International Search Report of PCT/CN2022/087669 dated May 27, 2022 with English translation, (9p).

*Primary Examiner* — Eric T Eide
(74) *Attorney, Agent, or Firm* — Arch & Lake LLP

(57) ABSTRACT

A magnetic conductive track and a lighting fixture are disclosed by the present disclosure. The magnetic conductive track includes a mounting main body and conductive substrates, each conductive substrate includes a magnetic attraction layer, an insulating layer, and a conductive layer, the magnetic attraction layer faces a mounting side of the mounting main body, the conductive layer faces a connecting side of the mounting main body and is exposed outside, and the magnetic attraction layer is used for attracting and connecting the lighting device.

14 Claims, 10 Drawing Sheets

(51) Int. Cl.

| | |
|---|---|
| ***F21V 21/096*** | (2006.01) |
| ***F21V 23/06*** | (2006.01) |
| ***F21Y 103/20*** | (2016.01) |

(56) References Cited

U.S. PATENT DOCUMENTS

| | | | | |
|---|---|---|---|---|
| 8,915,609 | B1 * | 12/2014 | Shah | F21S 8/035 362/648 |
| 11,242,982 | B2 * | 2/2022 | Cho | F21V 21/096 |
| 11,316,311 | B1 * | 4/2022 | Chan | F21S 2/00 |
| 2013/0044501 | A1 * | 2/2013 | Rudisill | F21V 29/70 362/398 |
| 2013/0337668 | A1 | 12/2013 | Ernest et al. | |
| 2015/0345757 | A1 * | 12/2015 | Ngai | F21V 21/35 362/249.01 |
| 2017/0184290 | A1 * | 6/2017 | Chiu | F21V 21/35 |

FOREIGN PATENT DOCUMENTS

| | | | |
|---|---|---|---|
| CN | 212537609 | U | 2/2021 |
| CN | 112524581 | A | 3/2021 |
| CN | 113154292 | A | 7/2021 |
| CN | 215636695 | U | 1/2022 |

* cited by examiner

MAGNETIC CONDUCTIVE TRACK AND LIGHTING DEVICE

CROSS-REFERENCE TO RELATED APPLICATION

This application is based upon and claims the priority of PCT patent application No. PCT/CN2022/087669 filed on Apr. 19, 2022 which claims priority to the Chinese Patent Application No. 202110450099.5 filed on Apr. 25, 2021, the entire disclosure of which is incorporated herein by reference.

TECHNICAL FIELD

The present disclosure relates to the field of lighting technology, and particularly, to a magnetic conductive track and a lighting fixture for a magnetic attraction and electrical connection to an electrical device.

BACKGROUND

The conductive track lamp mainly includes a conductive track fixed on the ceiling or the wall and various lamp bodies that can slide along the conductive track, which can be a spotlight, a line lamp, and the like. The commonly used low-voltage conductive tracks in the market basically use the copper strip, the aluminum substrate PCB or the resin PCB as a conductive component.

SUMMARY

Examples of the present disclosure provide a magnetic conductive track and lighting device.

Examples of the disclosure provide a magnetic conductive track for assembling on a mounting base and capable of forming a magnetic attraction and electrical connection with a lighting device. The magnetic conductive track may include: a mounting main body and a pair of conductive substrates; the mounting main body may include a mounting side and a connecting side arranged oppositely, the mounting side may face the mounting base and the connecting side facing the lighting device; and the pair of conductive substrates may be arranged on the connecting side of the mounting main body, each conductive substrate may include a magnetic layer, an insulating layer may be arranged on the magnetic layer, and a conductive layer may be arranged on the insulating layer.

The magnetic layer may face the mounting side, the conductive layer may face the connecting side and may be exposed outside for the lighting device to take power, and the magnetic layer is capable of being configured for attracting and connecting the lighting device.

The present disclosure also provides a lighting fixture, the lighting device may include the magnetic conductive track described above and a lighting device; the magnetic conductive track may be mechanically and electrically connected to the lighting device.

It is to be understood that the foregoing general description and the following detailed description are exemplary and explanatory only and are not restrictive of the disclosure.

BRIEF DESCRIPTION OF THE DRAWINGS

The drawings described here are used to provide a further understanding of the present disclosure and constitute a part of the present disclosure. The exemplary examples of the present disclosure and the descriptions are used to explain the present disclosure and do not constitute an improper limitation of the present disclosure. In the drawings.

DETAILED DESCRIPTION

Figure 1:
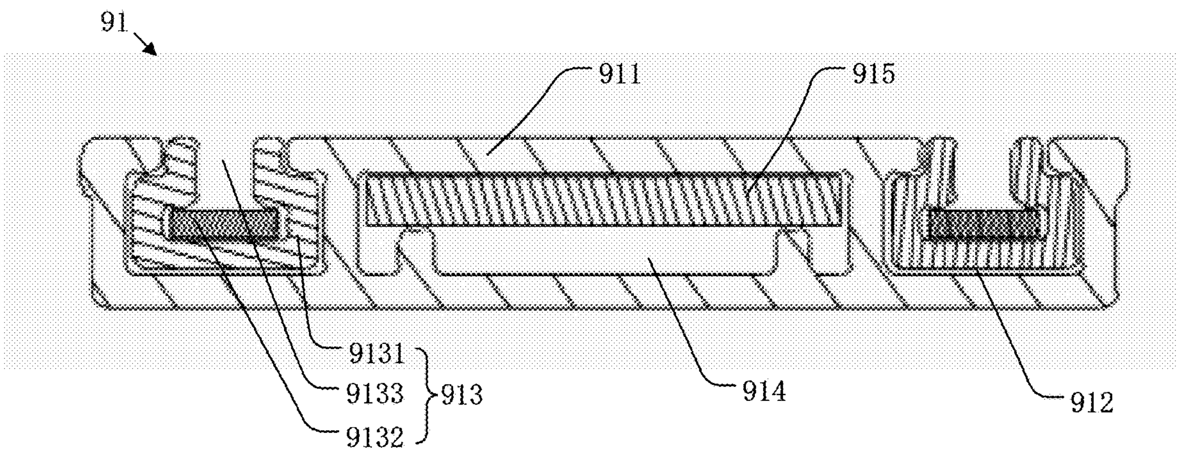
FIG. 1 is a schematically structural diagram of the low-voltage conductive track that supplies power from the top in the prior art.

In order to make the objects, technical solutions and advantages of the examples of the present disclosure apparent, the technical solutions of the examples are described in a clearly and fully understandable way in connection with the drawings related to the examples of the present disclosure. Apparently, the described examples are just a part but not all of the examples of the present disclosure. Based on the described examples herein, a person or ordinary skill in the art can obtain other example(s), without any inventive work, which should be within the scope of the present disclosure.

Reference numbers used in this disclosure may include:

a base 1, a lamp body 2, a connecting rod 3,
a nut 4, a gasket 5, a wire 6,
a mounting main body 10, a mounting wall 11, a convex rib 12,
a first conductive track wall 13, a second conductive track wall 14, a conductive substrate 20,
a magnetic layer 21, an insulating layer 22, a conductive layer 23,
an attraction element 30, a screw head 31, a screw rod 32, an elastic electrical contact 311,
a first screw hole 33, a fastener 34, a drive power source 40,
a magnetic conductive track 100, a first connection slot 101, a second connection slot 102,
a first power-taking slot 103, a second power-taking slot 104, a mounting side 110,
a connecting side 120, a mounting hole 111, a first space 112, a second space 113, a first protruding portion 131, a second protruding portion 121,
a third protruding portion 141, a fourth protruding portion 122, an electrical plug 200,
an extension portion 201, a head portion 202, a conductive elastic piece 203,
an upper housing 210, a lower housing 220, a sealing plug 300,
an insertion portion 301, a sealing head portion 302, a lighting device 400,
a lighting fixture 1000, a first connecting side 1010, a second connecting side 1020,
an upper base 1021, a lower base 1022,
a baffle 1211, a clamping slot 1221,
a socket 1030, a first conductive segment 2031, a second conductive segment 2032,
an anti-rotation slot 1200.

As illustrated in FIG. 1, FIG. 1 is a schematically structural diagram of the low-voltage conductive track that supplies power from the top in the prior art. The conductive track 91 includes a main body portion 911. Along the widthwise direction of the conductive track 91, the cross section of the main body portion 911 is generally flat. Two accommodating slots 912 are recessed in the upper surface of the main body portion 911. The accommodating slots 912 are arranged in parallel along the lengthwise direction of the conductive track 91. A coupling element 913 is accommodated in each accommodating slot 912. The coupling element 913 is insulated from the main body portion 911. Each coupling element 913 includes a clamping member 9131. A conductive sheet 9132 is clamped in the clamping member 9131. A docking space 9133 is provided on the upper surface of the clamping member 9131 to expose the conductive sheet 9132, so as to achieve electrical connection and power supply at the top. Between the two accommodating slots 912, the main body portion 911 is provided with an accommodating cavity 914 arranged along the lengthwise direction of the conductive track 91, and a magnetic component 915 is clamped in the accommodating cavity 914. However, because the magnetic component 915 is located at the top of the conductive track 91, the magnetic component 915 cannot directly contact the lamp body. The conductive sheet 9132 and the magnetic component 915 are both arranged laterally and arranged in a left-center-right manner, and the lamp is connected to the conductive track 91 in a face-to-face manner. The conductive part of the lamp is deeply docked into the docking space 9133 and connected with the conductive sheet 9132, and the magnetic part of the lamp is arranged face-to-face with the upper surface of the main body portion 911.

Figure 2:
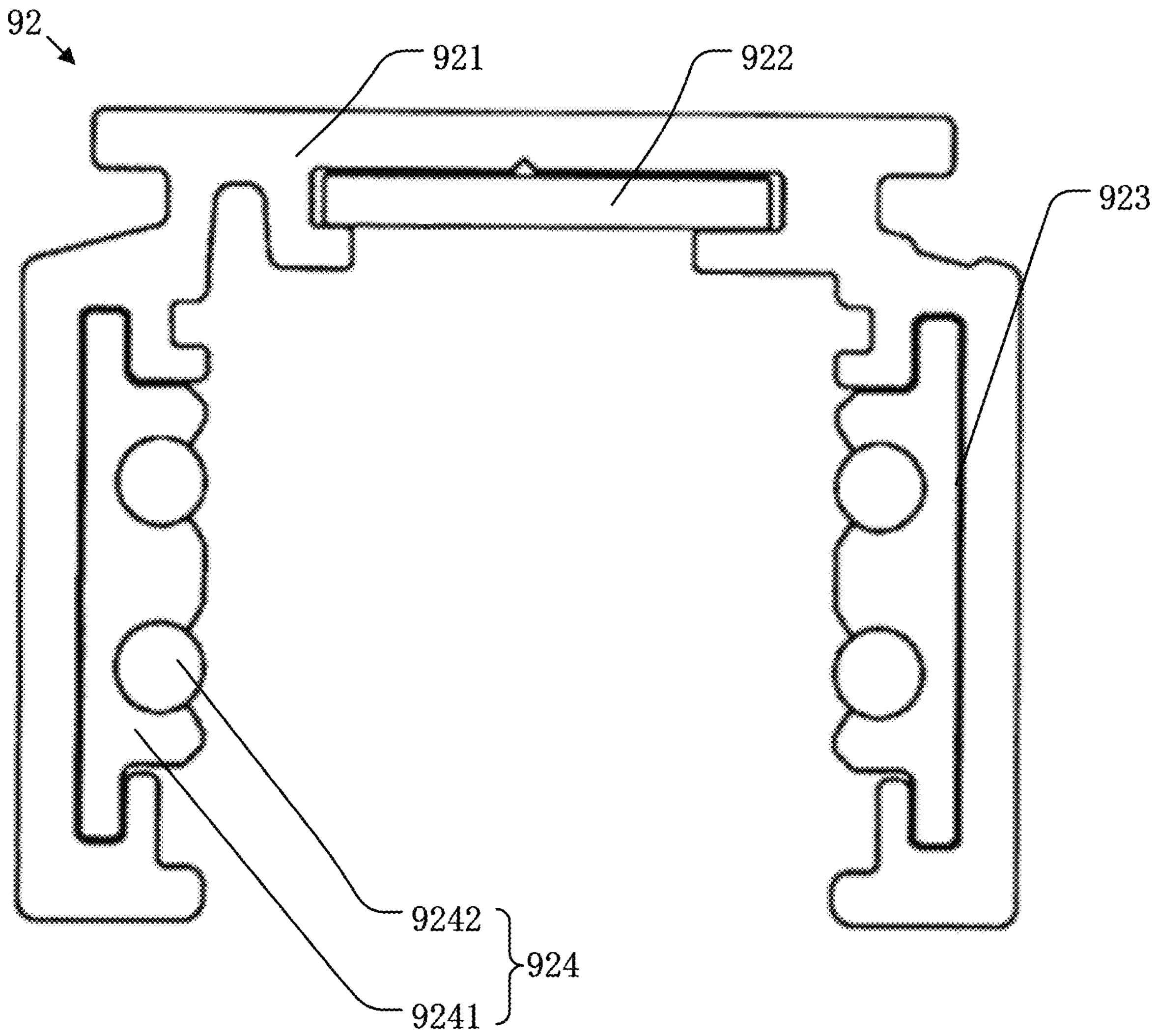
FIG. 2 is a schematically structural diagram of the low-voltage conductive track that supplies power from the inner wall of the conductive track in the prior art.

As illustrated in FIG. 2, FIG. 2 is a schematically structural diagram of the low-voltage conductive track that supplies power from the inner wall of the conductive track in the prior art. The conductive track 92 includes a main body portion 921 which is along the widthwise direction of the conductive track 92, the cross section of the main body portion 921 is substantially inverted U-shaped. A magnetic component 922 is clamped at the inner top surface of the main body portion 921. Similarly, because the magnetic component 922 is located at the top of the conductive track 92, the magnetic component 922 cannot directly contact the lamp body, so the absorption capacity is weak. Accommodating slots 923 are respectively provided at the left and right inner walls of the main body 921, and the accommodating slots 923 are arranged in parallel along the lengthwise direction of the conductive track 92, and a coupling element 924 is accommodated in each accommodating slot 923. The coupling element 924 is insulated from the main body portion 921, and each coupling element 924 includes a clamping member 9241, a conductive component 9242 is clamped inside the clamping member 9241, and the conductive component 9242 is exposed on the left and right inner walls of the main body portion 921, thereby realizing the power supply from the inner wall of the conductive track 92.

It can be seen that no matter whether the power is supplied from the top or the inner wall of the conductive track, the conductive sheet 9132 or the conductive component 9242 in the low-voltage conductive track is basically made of the copper strip, the aluminum substrate PCB (circuit board) or the resin PCB; for the copper strip conductive sheet, the insulation strip is needed for electrical isolation, and an iron plate is needed to be built into the back as magnetic components 915 and 922; for the aluminum substrate PCB or the resin PCB conductive sheet, an iron plate is also needed to be built into the back as magnetic components 915 and 922, so the overall design has many parts, and the assembly process is also complex.

Figure 3:
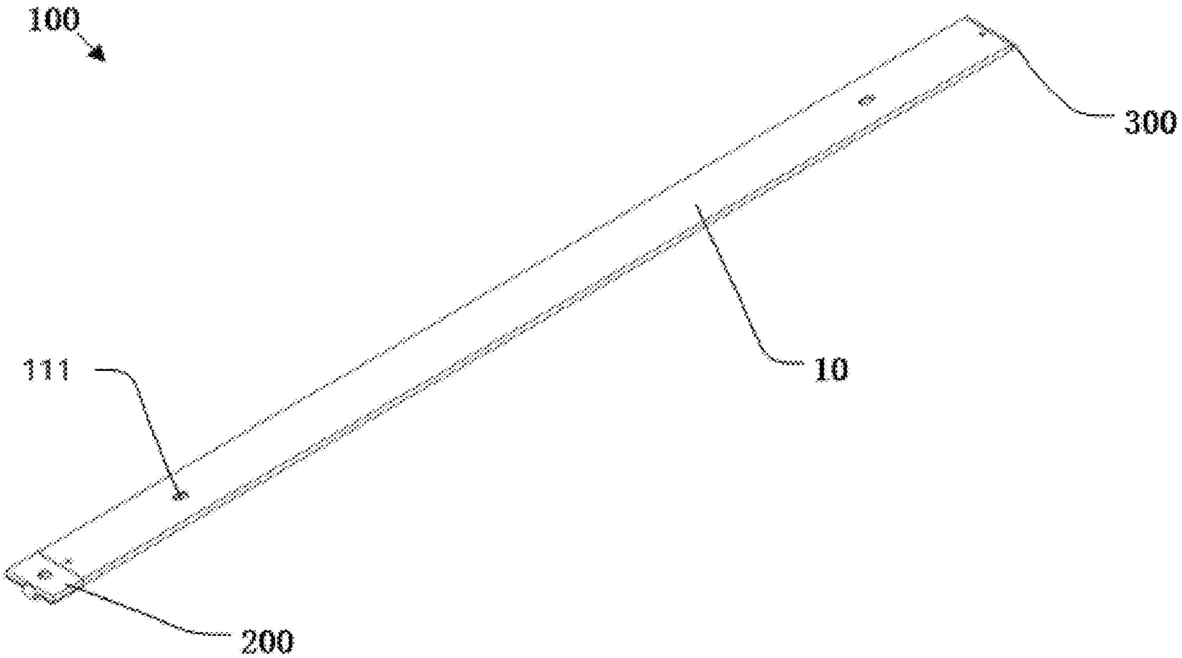
FIG. 3 is a perspective view of a magnetic conductive track provided in an example of the present disclosure.
Figure 4:
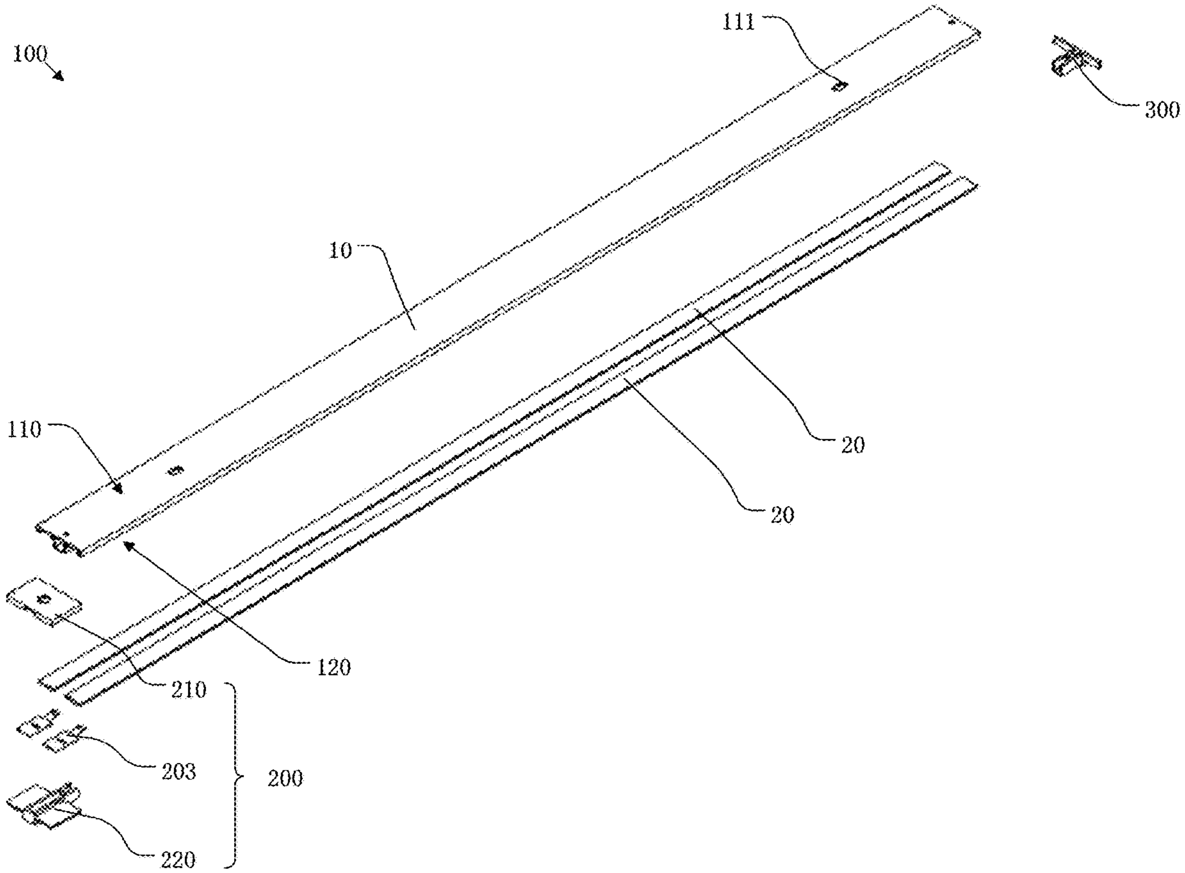
FIG. 4 is a schematic diagram of the exploded structure of the magnetic conductive track illustrated in FIG. 3.
Figure 5:
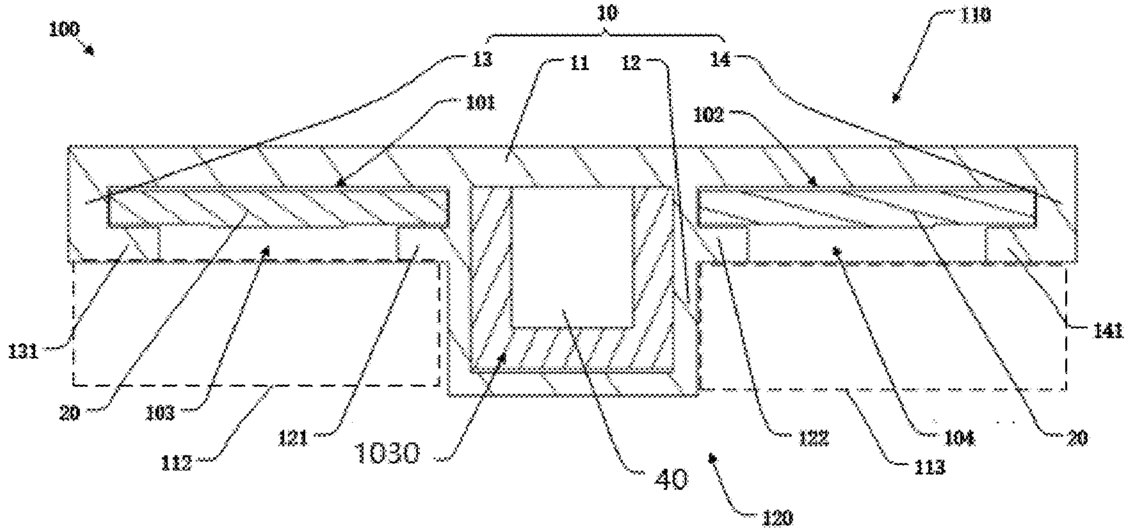
FIG. 5 is a cross-sectional view of the magnetic conductive track provided by an example of the present disclosure.

As illustrated in FIG. 3 to FIG. 5, the example of the present disclosure discloses a magnetic conductive track 100, the magnetic conductive track 100 is in a long and flat shape and is used to be assembled on a mounting base and can form a magnetic attraction and electrical connection with a lighting device (not shown). The magnetic conductive track 100 includes a mounting main body 10 and a pair of conductive substrates 20; the mounting main body 10 extends along the lengthwise direction and is flat, the mounting main body 10 includes a mounting side 110 and a connecting side 120 arranged oppositely, the mounting side 110 faces the mounting base, and the connecting side 120 faces the lighting device; the pair of conductive substrates 20 are symmetrically arranged on the connecting side 120 of the mounting main body 10.

Figure 6:
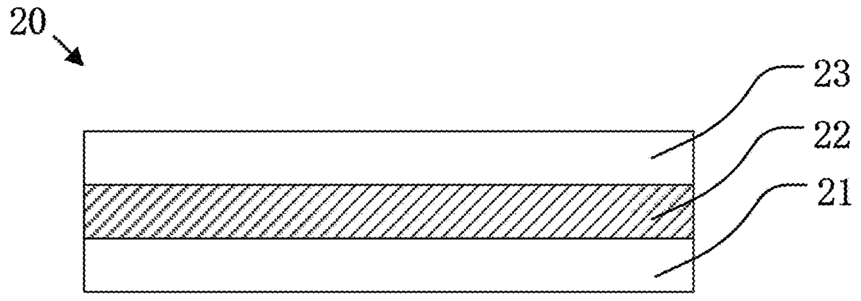
FIG. 6 is a schematic diagram of the layer structure of the conductive substrate provided by an example of the present disclosure.
Figure 7:
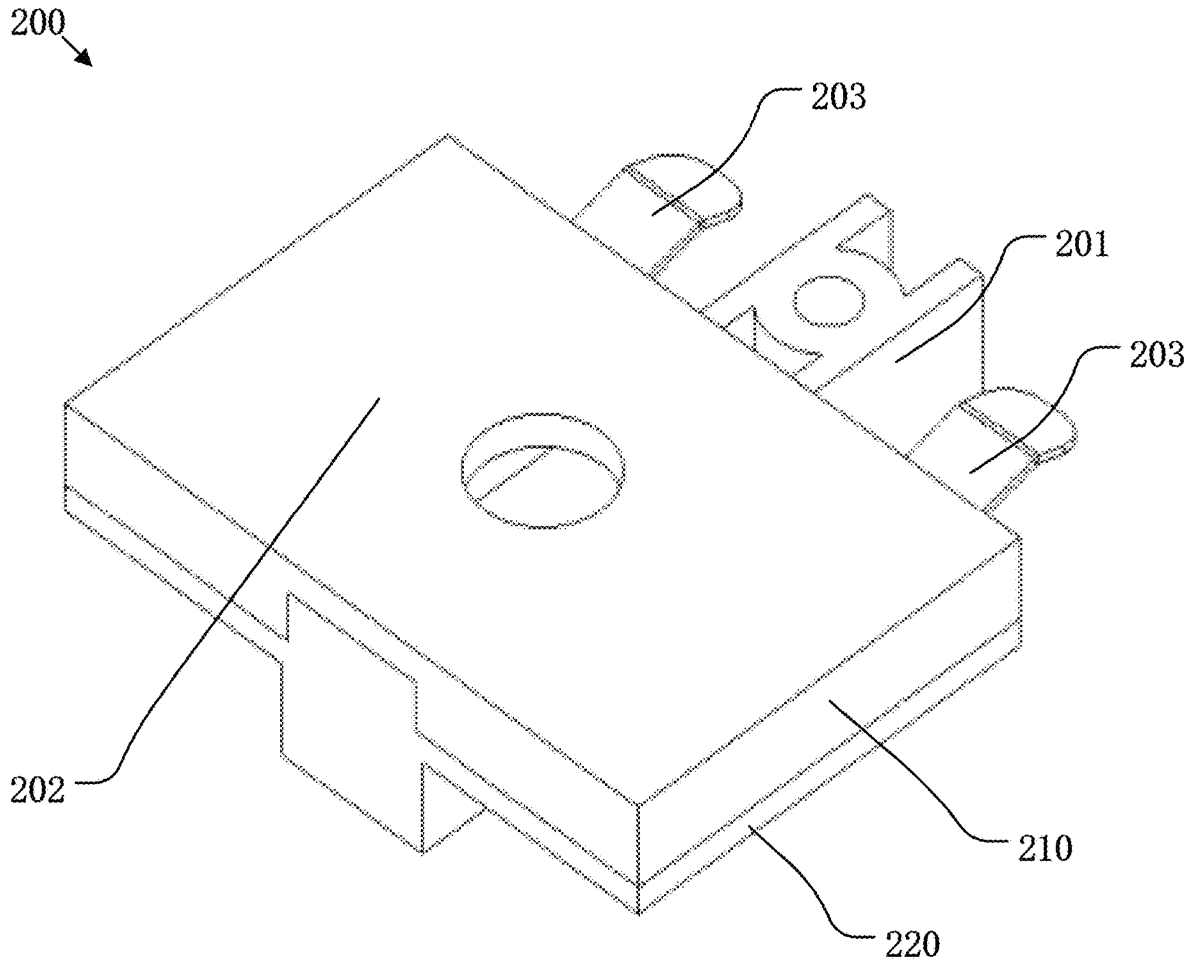
FIG. 7 is a perspective view of the electrical plug provided by an example of the present disclosure.
Figure 8:
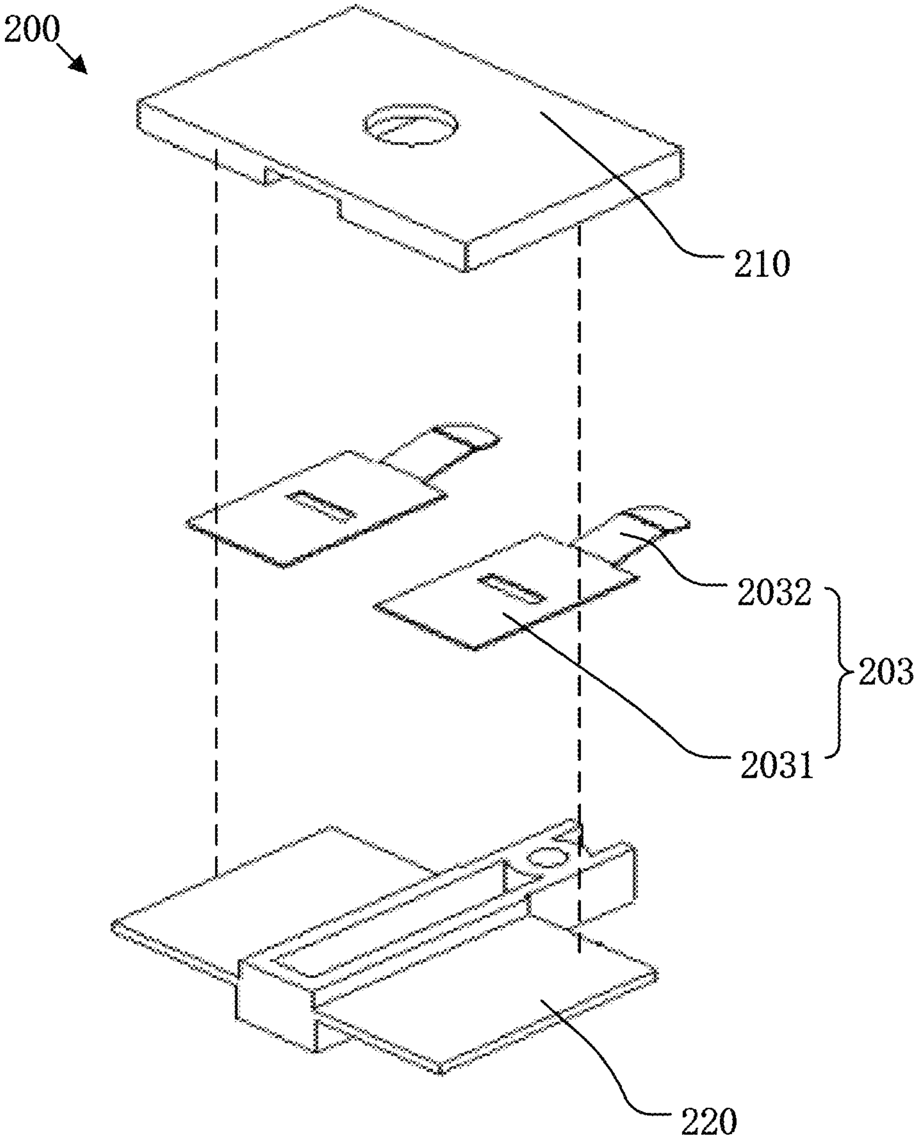
FIG. 8 is a schematic diagram of the exploded structure of the electrical plug illustrated in FIG. 7.

As illustrated in FIG. 6, the conductive substrate 20 includes a magnetic layer 21, an insulating layer 22 arranged on the magnetic layer 21, and a conductive layer 23 arranged on the insulating layer 22; the magnetic layer 21 faces the mounting side 110, the conductive layer 23 faces the connecting side 120 and is exposed outside for the lighting device to take power, and the magnetic layer 21 can be used for adsorbing and connecting the lighting device.

In the present example, the conductive substrate 20 is flat and extends along the lengthwise direction of the mounting main body 10. Preferably, the conductive substrate 20 and the mounting main body 10 are insulated from each other.

In the present example, the magnetic layer 21 is an iron-based layer; the conductive layer 23 is a conductive copper foil or a copper strip. It can be understood that, in other examples, the conductive substrate 20 can also be an iron substrate, which has both the function of the conductive layer 23 and the function of the magnetic layer 21.

In the present example, the mounting main body 10 includes a mounting wall 11, a first connection slot 101 and a second connection slot 102 in parallel, and a first power-taking slot 103 and a second power-taking slot 104 in parallel.

The mounting wall 11 is located on the mounting side 110 and is used to mount the mounting main body 10 on the mounting base; the mounting wall 11 is provided with at least two oval mounting holes 111 near two ends, the number of mounting holes 111 is provided according to the length of the magnetic conductive track 100. The mounting hole 111 is used for the screw to pass through, and the screw head is finally pressed against both sides of the mounting hole 111 of the mounting wall 11 and locked with the mounting base (ceiling or wall) thereby fastening the magnetic conductive track 100 on the mounting base.

The first connection slot 101 and the second connection slot 102 are located below the mounting wall 11; the first power-taking slot 103 and the second power-taking slot 104 are respectively located under the corresponding first connection slot 101 and the second connection slot 102 and connected with the corresponding first connection slot 101 and the second connection slot 102, the first power-taking slot 103 and the second power-taking slot 104 are located at the connecting side 120 and are open to connect the lighting devices; the pair of conductive substrates 20 are respectively arranged in the corresponding first connection slot 101 and the second connection slot 102, and the magnetic layer 21 faces the mounting wall 11, the conductive layer 23 faces the first power-taking slot 103 and the second power-taking slot 104, respectively, and is exposed in the first power-taking slot 103 and the second power-taking slot 104.

In the present example, the mounting main body 10 is in a convex shape. The mounting main body 10 further includes a convex rib 12, a first conductive track wall 13 and a second conductive track wall 14; the convex rib 12 is arranged on the connecting side 120 and between the two conductive substrates 20; the first conductive track wall 13 and a second conductive track wall 14 are arranged on the connecting side 120, and the first conductive track wall 13 and the second conductive track wall 14 are arranged on two sides of the convex rib 12; the connection slot 101 is formed between the first conductive track wall 13 and the convex rib 12; the second connection slot 102 is formed between the convex rib 12 and the second conductive track wall 14.

In the present example, the convex rib 12, the first conductive track wall 13, and the second conductive track wall 14 are vertically connected to the lower surface of the mounting wall 11; the mounting wall 11, the convex rib 12, the first conductive track wall 13, and the second conductive track wall 14 all extend along the lengthwise direction of the mounting main body 10; the first connection slot 101 and the second connection slot 102, the first power-taking slot 103 and the second power-taking slot 104 are all parallel to the mounting wall 11. The top surface of the mounting wall 11 constitutes the mounting side 110; the bottom surface of the convex rib 12, the bottom surface of the first conductive track wall 13, and the bottom surface of the second conductive track wall 14 jointly constitutes the connecting side 120, the bottom surface of the convex rib 12 is lower than the bottom surface of the first conductive track wall 13 and the bottom surface of the second conductive track wall 14.

More specifically, the convex rib 12, the first conductive track wall 13, and the second conductive track wall 14 are connected to the lower surface of the mounting wall 11 and arranged at intervals. Specifically, the convex rib 12 is vertically connected to the middle part of the lower surface of the mounting wall 11, the first conductive track wall 13 and the second conductive track wall 14 are vertically connected with two sides of the lower surface of the mounting wall 11, the first conductive track wall 13 and the second conductive track wall 14 are arranged parallel to each other, a first connection slot 101 extending along the lengthwise direction is formed between the first conductive track wall 13 and the convex rib 12, a first connection slot 101 extending along the lengthwise direction is formed between the first conductive track wall 13 and the convex rib 12, and a second connection slot 102 extending along the lengthwise direction is formed between the convex rib 12 and the second conductive track wall 14.

In the present example, the first conductive track wall 13 is provided with a first protruding portion 131, and the first protruding portion 131 is arranged parallel to the mounting wall 11; the convex rib 12 is provided with a second protruding portion 121, the second protruding portion 121 is arranged parallel to the mounting wall 11; the second protruding portion 121 is arranged oppositely to the first protruding portion 131 to surround and form the first connection slot 101.

In the present example, the second conductive track wall 14 is provided with a third protruding portion 141, and the third protruding portion 141 is arranged parallel to the mounting wall 11; the convex rib 12 is provided with a fourth protruding portion 122, the fourth protruding portion 122 is arranged parallel to the mounting wall 11; the fourth protruding portion 122 is arranged oppositely to the third protruding portion 141 to surround and form the second connection slot 102.

In the present example, along the lengthwise direction of the mounting main body 10, the length of the first conductive track wall 13 is equal to the length of the second conductive track wall 14, and both are equal to the length of the convex rib 12; a first space 112 is formed between the convex rib 12 and the first conductive track wall 13 for mounting a lamp body; and a second space 113 is formed between the convex rib 12 and the second conductive track wall 14 for mounting the lamp body.

In the present example, the mounting main body 10 is formed with a socket 1030 at each end along the lengthwise direction of the mounting main body, the socket 1030 is in the shape of a square cross-section in the widthwise direction of the mounting main body 10, thereby two sockets 1030 are formed at two ends of the mounting main body 10 along the lengthwise direction.

As illustrated in FIG. 4, FIG. 5, FIG. 7, and FIG. 8, in the example of the present disclosure, an electric plug 200 is also clamped in any one of the sockets 1030; the electrical plug 200 forms an electrical connection with the conductive substrate 20 at the end of the first connection slot 101 and the second connection slot 102, respectively.

In the example of the present disclosure, the electrical plug 200 is provided with a pair of conductive elastic pieces 203 in the position corresponding to the conductive substrate 20, the conductive elastic pieces 203 can form the electrical connection with the corresponding conductive substrates 20 in the corresponding first connection slot 101 and the second connection slot 102. When the electrical plug 200 is clamped in the socket 1030, the pair of conductive elastic pieces 203 are electrically connected to the ends of the pair of conductive substrates 20 at the ends of the first connection slot 101 and the second connection slot 102, respectively.

In the example of the present disclosure, the electrical plug 200 further includes an extension portion 201 and a head portion 202; the extension portion 201 is accommodated in the socket 1030; the head portion 202 is blocked outside the socket 1030 and keep flush with the outermost edge of the mounting main body 10; the head portion 202 is connected to the extension portion 201, the width and height of the head portion 202 are equal to the width and height of the mounting main body 10, respectively, and the width and the height of the extension portion 201 are both less than the width and height of the head portion 202.

In the example of the present disclosure, each conductive elastic piece 203 includes a first conductive segment 2031 and a second conductive segment 2032; the first conductive segment 2031 is clamped in the head portion 202; the second conductive segment 2032 is vertically connected to one end of the first conductive segment 2031 towards the extension portion 201, and the second conductive segment 2032 protrudes outside the head portion 202 to form an elastic contact portion. The elastic contact portion is an arc-shaped elastic contact portion, which provides both the function of electrical contact and a guiding function during electrical connection. When the electrical plug 200 is clamped in the socket 1030, the elastic contact portion respectively enters the first connecting slot 101 and the second connection slot 102 to form an electrical connection with the conductive substrate 20.

In the example of the present disclosure, the electrical plug 200 includes an upper housing 210 and a lower housing 220; the upper housing 210 and the lower housing 220 have basically the identical structure. In detail, the upper housing 210 is provided with an upper head portion; the lower housing 220 is inter-assembled with the upper housing 210, and is provided with a lower head portion corresponding to the upper head portion and the extension portion 201; the upper head portion and the lower head portion form the head portion 202; the pair conductive elastic pieces 203 are accommodated between the upper housing 210 and the lower housing 220.

Figure 9:
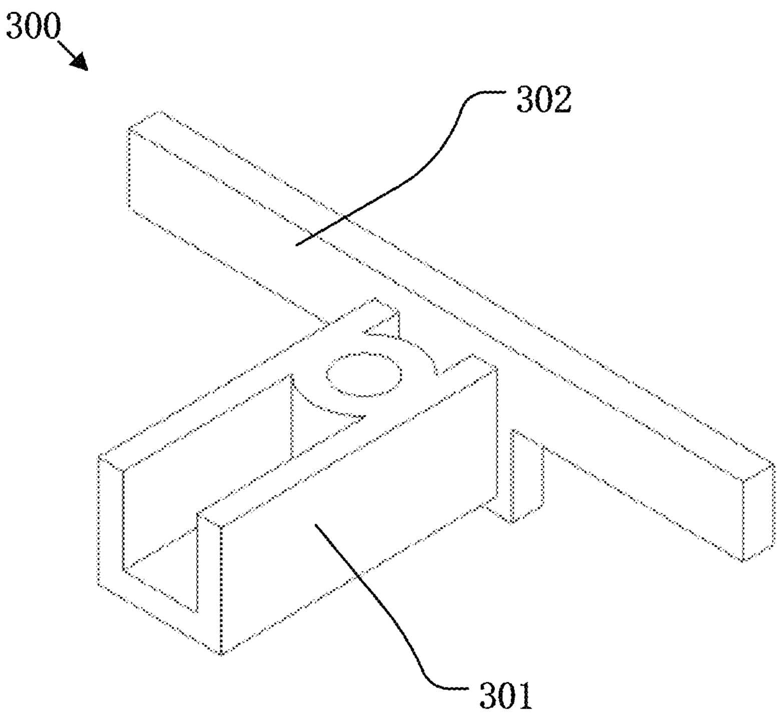
FIG. 9 is a perspective view of the sealing plug provided by an example of the present disclosure.

As illustrated in FIG. 4, FIG. 5, and FIG. 9, in the example of the present disclosure, a sealing plug 300 is clamped in another other socket 1030. The shape of the sealing plug 300 is consistent as much as possible with the electrical plug 200.

In the example of the present disclosure, the sealing plug 300 includes an insertion portion 301 and a sealing head portion 302; the insertion portion 301 is accommodated in the socket 1030; the sealing head portion 302 seals outside the socket 1030 and keep flush with the outermost edge of the mounting main body 10; the sealing head portion 302 is connected to the insertion portion 301, and the width and height of the sealing head portion 302 are both equal to the width and height of the mounting main body 10, the width and height of the insertion portion 301 are both less than the width and height of the sealing head portion 302.

In the example of the present disclosure, a holding space is formed between the two sockets 1030 along the lengthwise direction of the mounting main body 10 by the convex rib; the magnetic conductive track 100 further includes a drive power source 40, the drive power source 40 is received within the holding space. The extending direction of the drive power source is the extending direction of the length of the magnetic conductive track 100. The drive power source 40 may include various circuit modules and a control module, a Bluetooth module or a WIFI module (it may be that the control module is integrated with a Bluetooth module or a WIFI module).

Figure 10:
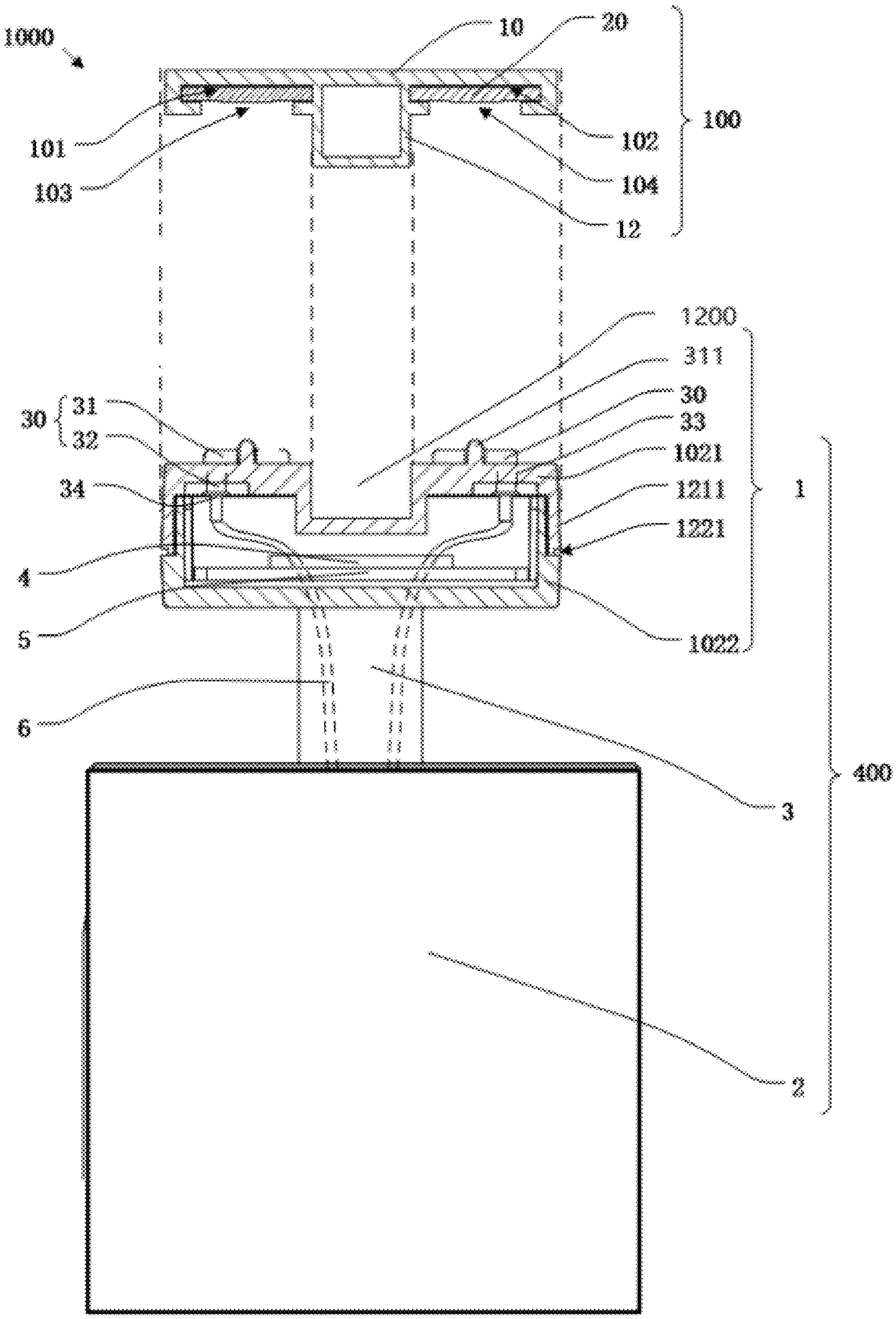
FIG. 10 is a schematic diagram of the disassembled structure of the lighting device provided by an example of the present disclosure.
Figure 11:
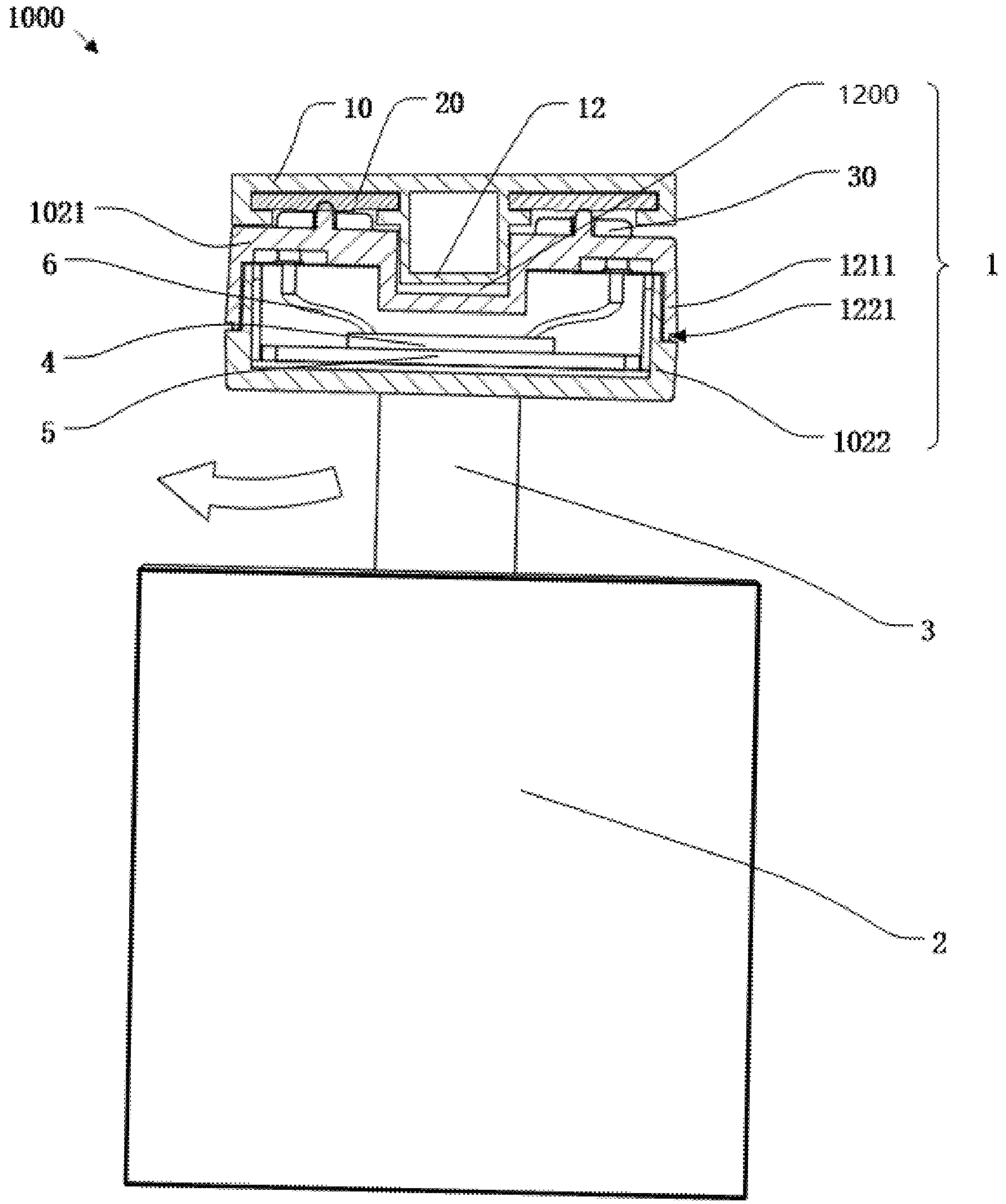
FIG. 11 is a schematically structural diagram of the lighting fixture provided by an example of the present disclosure.
Figure 12:
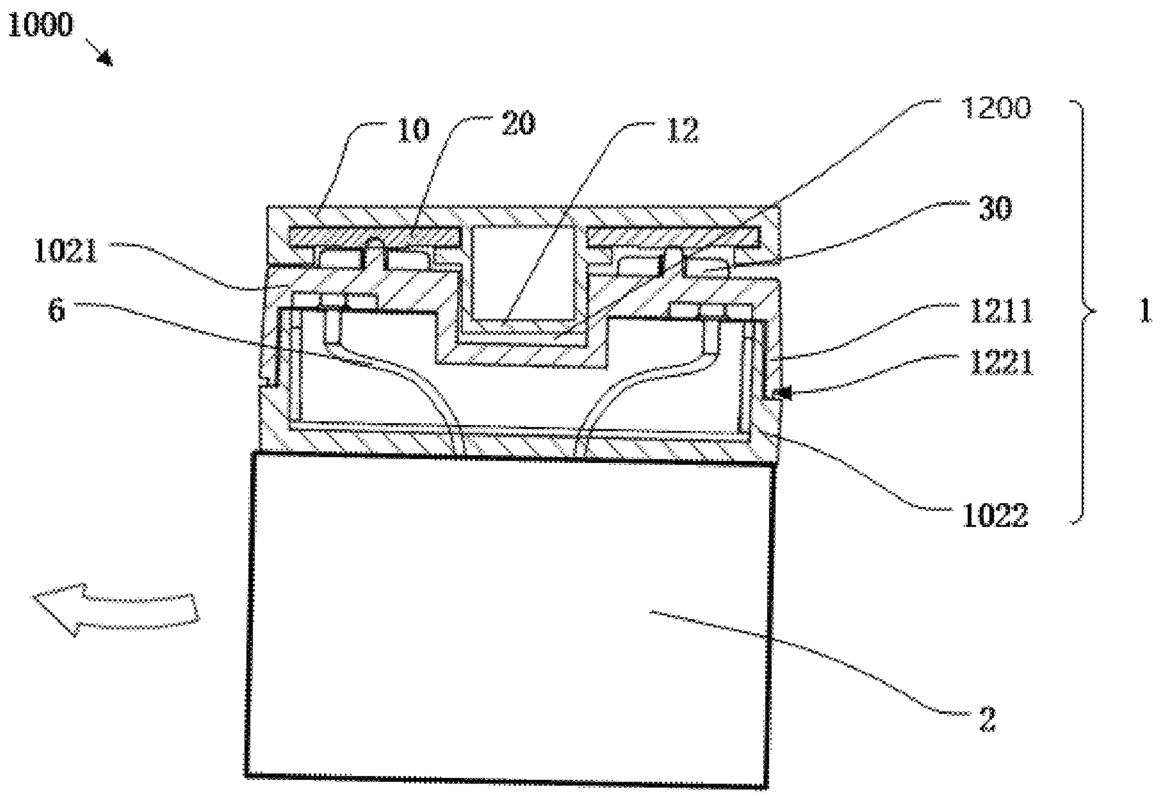
FIG. 12 is a schematically structural diagram of the lighting fixture provided by another example of the present disclosure.

Please refer to FIG. 10, FIG. 11, and FIG. 12, and in combination with the above-mentioned examples, the present disclosure also provides a lighting fixture 1000, the lighting device 1000 includes the above-mentioned magnetic conductive track 100.

Please refer to FIG. 10, FIG. 11, and FIG. 12, the lighting fixture 1000 further includes a lighting device 400, and the lighting device 400 and the magnetic conductive track 100 can form a magnetic attraction and electrical connection.

The magnetic conductive track 100 includes a mounting side and a first connecting side 1010 arranged oppositely, the mounting side of the magnetic conductive track 100 is served by the mounting side 110 of the mounting main body 10 of the magnetic conductive track 100, the first connecting side 1010 of the magnetic conductive track 100 is served by the connecting side 120 of the mounting main body 10 of the magnetic conductive track 100.

As illustrated in FIG. 10, FIG. 11, and FIG. 12, the lighting device 400 includes a base 1 and a lamp body 2, the base 1 has a lamp body side and a second connecting side 1020 arranged oppositely, and the lamp body 2 is mounted on the lamp body side of the base 1; the second connecting side 1020 faces the first connecting side 1010.

In the example of the present disclosure, as illustrated in FIG. 10, FIG. 11, and FIG. 12, the second connecting side 1020 is provided with an anti-rotation slot 1200 and two attraction elements 30, the anti-rotation slot 1200 is recessed into the base 1, that is, the anti-rotation slot 1200 is recessed toward the direction away from the first connecting side 1010, and the anti-rotation slot 1200 is clamped with the convex rib 12 and prevents the shaking in the left-right direction to achieve a rotation-stop effect. The depth of the anti-rotation slot 1200 recessed into the second connecting side 1020 is greater than or equal to the height of the convex rib 12 protruding from the first connecting side 1010. The attraction elements 30 are arranged on two sides of the anti-rotation slot 1200 and faces the first connecting side 1010; the first connecting side 1010 and the second connecting side 1020 are abutted against each other, the convex rib 12 extends into the anti-rotation slot 1200, and the two attraction elements 30 extend into the first connection slot 101 and the second connection slot 102, respectively, and form a magnetic attraction with the conductive substrates.

In the present example, the second connecting side 1020 further includes two elastic electrical contacts 311, respectively passing through the corresponding attraction elements 30 and extending toward the conductive substrates 20; the two elastic electrical contacts 311 extend into the first connection slot 101 and the second connection slot 102 respectively, and are used for electrically connecting the conductive layers 23 of the conductive substrates 20. Because the attraction element 30 is arranged around the elastic electrical contact 311, the attraction element 30 also has the function of protecting the elastic electrical contact 311.

In order to improve the anti-rotation effect of the anti-rotation slot 1200, the proportional relationship between the extension depth and width of the anti-rotation slot 1200 is designed as follows: when the lighting device 400 shakes in the left-right direction on the magnetic conductive track 100, before the elastic electrical contact 311 at one side is detached from the conductive substrate 20, the anti-rotation slot 1200 abuts against the convex rib 12, thereby preventing the lighting device 400 from continuing to rotate.

As illustrated in FIG. 6, FIG. 10 and FIG. 11, the conductive layer 23 is used for conducting electricity, so that the conductive substrate 20 is used for conducting electricity, and the elastic electrical contact 311 and the conductive substrate 20 are used for conducting electricity. The elastic electrical contact 311 is connected to the lighting device 400 through the wire 6, thereby enabling an external drive power source to supply power to the lighting device 400 through the magnetic conductive track 100.

In the present example, the base 1 includes an upper base 1021 and a lower base 1022; the upper base 1021 is the upper surface of the base 1, and the lower base 1022 is the lower surface of the base 1; the upper base 1021 is provided with the anti-rotation slot 1200 and the attraction element 30; the anti-rotation slot 1200 is arranged between two adjacent attraction elements 30; the lower base 1022 is mounted directly below the upper base 1021.

As illustrated in FIG. 10, FIG. 11 and FIG. 12, in the present example, the attraction element 30 is a magnetic screw structure, including a screw head 31 and a screw rod 32; the upper base 1021 is provided with a first screw hole 33, the first screw hole 33 is disposed corresponding to the conductive substrate 20; the upper surface of the lower base 1022 is provided with a fastener 34, and the wire 6 is disposed corresponding to the first screw hole 33; the screw rod 32 passes through the first screw hole 33 and is screwed tightly with the screw rod 32 by the fastener 34, and the wire 6 is electrically connected to the bottom of the screw rod 32.

In the present example, the two sides of the upper base 1021 are respectively provided with a baffle 1211; the upper end of the lower base 1022 is provided with a clamping slot 1221, and the lower base 1022 is clamped between the two baffles 1211 of the upper base 1021 by the clamping slot 1221. The cross-section of the upper base 1021 and the lower base 1022 is in the shape of a square after the upper base 1021 and the lower base 1022 are fastened together, and an operation cavity for mounting the lamp body 2 is formed between the upper base 1021 and the lower base 1022.

As illustrated in FIG. 11, in the present example, the lower surface of the base 1 is provided with a through hole (corresponding to the position of the connecting rod 3 below the nut 4); one end of the connecting rod 3 passes through the through hole and is fastened on the lower surface of the base 1 by a nut 4; the lamp body 2 is connected with the other end of the connecting rod 3. One end of the wire 6 is electrically connected to the bottom of the screw rod 32 to realize electrical connection with the elastic electrical contact 311, and the other end of the wire 6 is electrically connected to the lamp body 2 through the through hole. It can be understood that the nut 4 is located in the operation cavity, and the operation cavity is convenient for tightening the nut 4.

As illustrated in FIG. 11, in the present example, a gasket 5 is also arranged between the nut 4 and the lower surface of the base 1, and the outer diameter of the gasket 5 is larger than the outer diameter of the through hole. The nut 4 is screwed tightly with the connecting rod 3, and is used to fasten the connecting rod 3 to the through hole of the base 1. The gasket 5 can increase the contact area and strengthen the fastening between the nut 4 and the connecting rod 3, and a through hole is provided in the center of the connecting rod 3 and the nut 4 for the passing of the wire 6, thereby enabling the elastic electrical contact 311 to be electrically connected to the lamp body 2 through the wire 6.

As illustrated in FIG. 12, in another example, the base 1 and the lamp body 2 in the lighting device 400 are provided integrally, or the base 1 and the lamp body 2 are connected by an adapter to form an integral structure.

At least one of the above technical solutions adopted in the examples of the present disclosure can achieve the following beneficial effects:

The magnetic conductive track and lighting fixture provided by the examples of the present disclosure use the conductive substrate with both conductive function and magnetic property, and the conductive and magnetic structures are integrated together, eliminating the insulation strip and the iron component, the overall articles are fewer, the assembly process is simplified, and the cost is lower. Moreover, the visual detection can be facilitated by supplying the power to the conductive substrate at the lower part of two sides of the conductive track.

Examples of the present disclosure provide a magnetic conductive track and lighting device to solve the technical problem that the existing low-voltage conductive track technology: using the copper strip, the aluminum substrate PCB or the resin PCB as the conductive component, the insulation strip is needed for electrical isolation for the copper strip, and an iron plate is needed to be built into the back as magnetic components; an iron plate is also needed to be built into the back as magnetic components for the aluminum substrate PCB or the resin PCB, the overall design has many parts, and the assembly process is also complex.

Examples of the disclosure adopt the following technical solutions: a magnetic conductive track for assembling on a mounting base and capable of forming a magnetic attraction and electrical connection with a lighting device. The magnetic conductive track comprises: a mounting main body and a pair of conductive substrates; the mounting main body including a mounting side and a connecting side arranged oppositely, the mounting side facing the mounting base and the connecting side facing the lighting device; and the pair of conductive substrates being arranged on the connecting side of the mounting main body, each conductive substrate comprising a magnetic layer, an insulating layer arranged on the magnetic layer, and a conductive layer arranged on the insulating layer. The magnetic layer faces the mounting side, the conductive layer faces the connecting side and is exposed outside for the lighting device to take power, and the magnetic layer is capable of being configured for attracting and connecting the lighting device.

Further, each conductive substrate is flat and extends along a lengthwise direction of the mounting main body.

Further, the magnetic layer is an iron-based layer; and the conductive layer is a conductive copper foil.

Further, the mounting main body comprises: a mounting wall, a first connection slot and a second connection slot in parallel, and a first power-taking slot and a second power-taking slot in parallel; the mounting wall being located on the mounting side, and configured for mounting the mounting main body on the mounting base; the first connection slot and the second connection slot in parallel being located below the mounting wall; and the first power-taking slot and the second power-taking slot in parallel being located below and connected to the corresponding first connection slot and the second connection slot respectively, and the first power-taking slot and the second power-taking slot being located on the connecting side and being open to connect the lighting device. The pair of conductive substrates are respectively arranged in the corresponding first connection slot and the second connection slot, the magnetic layer faces the mounting wall, the conductive layer faces the first power-taking slot and the second power-taking slot, respectively, and is exposed in the first power-taking slot and the second power-taking slot.

Further, the mounting main body further comprises: a convex rib and a first conductive track wall and a second conductive track wall; the convex rib is arranged on the connecting side; and the first conductive track wall and the second conductive track wall are arranged on the connecting side, and the first conductive track wall and the second conductive track wall are arranged on two sides of the convex rib, respectively; the first connection slot is formed between the first conductive track wall and the convex rib; and the second connection slot is formed between the convex rib and the second conductive track wall; the convex rib, the first conductive track wall, and the second conductive track wall are all vertically connected to a lower surface of the mounting wall; the mounting wall, the convex rib, the first conductive track wall, and the second conductive track wall all extend along the lengthwise direction of the mounting main body; the first connection slot, the second connection slot, the first power-taking slot, and the second power-taking slot are all parallel to the mounting wall; a top surface of the mounting wall constitutes the mounting side; a bottom surface of the convex rib, a bottom surface of the first conductive track wall, and a bottom surface of the second conductive track wall jointly constitutes the connecting side, the bottom surface of the convex rib is lower than the bottom surface of the first conductive track wall and the bottom surface of the second conductive track wall; the mounting main body is in a convex shape; a first space is formed for mounting a lamp body between the convex rib and the first conductive track wall; and a second space is formed for mounting a lamp body between the convex rib and the second conductive track wall.

Further, the mounting main body is formed with a socket at each end along the lengthwise direction of the mounting main body.

Further, the magnetic conductive track further comprises an electrical plug; the electrical plug is capable of being inserted into one of the sockets; the electrical plug comprises two conductive elastic pieces, and the conductive elastic piece is capable of forming an electrical connection with the corresponding conductive substrate in the corresponding first connection slot and the second connection slot; the electrical plug further comprises: an extension portion and a head portion; the extension portion is accommodated in the socket; and the head portion is located outside the socket; the head portion is connected to the extension portion. A width and a height of the head portion are respectively equal to a width and a height of the mounting main body, and a width and a height of the extension portion are both less than the width and the height of the head portion; each conductive elastic piece comprises: a first conductive segment and a second conductive segment; the first conductive segment is clamped in the head portion; and the second conductive segment is vertically connected to one end of the first conductive segment towards the extension portion, and the second conductive segment protrudes outside the head portion to form an elastic contact portion; when the electrical plug is clamped in the socket, the elastic contact portion respectively enters the first connection slot and the second connection slot to form an electrical connection with the conductive substrate; the electrical plug comprises: an upper housing and a lower housing; the upper housing is provided with an upper head portion; and the lower housing provided with a lower head portion corresponding to the upper head portion and the extension portion. The upper housing and the lower housing are assembled with each other, and the upper head portion and the lower head portion form the head portion; the pair conductive elastic pieces are accommodated between the upper housing and the lower housing.

Further, a sealing plug is clamped in another socket.

Further, the sealing plug comprises: an insertion portion and a sealing head portion; the insertion portion is accommodated in the socket; and the sealing head portion seals outside the socket; the sealing head portion is connected to the insertion portion. A width and a height of the sealing head portion are respectively equal to a width and a height of the mounting main body, and a width and a height of the insertion portion are both less than the width and the height of the sealing head portion.

Further, a holding space is formed by the convex rib along the lengthwise direction of the mounting main body; the magnetic conductive track further comprises a drive power source, the drive power source is arranged within the holding space.

The present disclosure also provides a lighting fixture, the lighting device comprises the magnetic conductive track described above and a lighting device; the magnetic conductive track is mechanically and electrically connected to the lighting device.

Further, the magnetic conductive track is configured to be assembled on the mounting base, the magnetic conductive track comprises a mounting side and a first connecting side arranged oppositely, the mounting side of the magnetic conductive track is served by a mounting side of a mounting main body of the magnetic conductive track, the first connecting side of the magnetic conductive track is served by a connecting side of the mounting main body of the magnetic conductive track; the first connecting side is provided with a convex rib, a first connection slot, and a second connection slot, and a pair of conductive substrates. The first connection slot and the second connection slot are arranged on two sides of the convex rib, and each of the first connection slot and the second connection slot has an open end facing the lighting device and a closed end away from the lighting device; the convex rib protrudes toward the lighting device and beyond the open end of the first connection slot and the second connection slot; the pair of conductive substrates are respectively arranged in and exposed to the corresponding first connection slot and the second connection slot; the lighting device comprises a base with a lamp body side and a second connecting side arranged oppositely. The second connecting side faces the first connecting side, and the second connecting side is provided with an anti-rotation slot and two attraction elements, the anti-rotation slot is recessed into the base, and the attraction elements are arranged on two sides of the anti-rotation slot and faces the first connecting side. The first connecting side and the second connecting side are abutted against each other, the convex rib extends into the anti-rotation slot, and the two attraction elements extend into the first connection slot and the second connection slot respectively and form a magnetic attraction with the conductive substrates.

Further, the lighting device further comprises a lamp body, and the lamp body is connected to the lamp body side of the base by a connecting rod; the base comprises: an upper base and a lower base. The upper base is provided with the anti-rotation slot and the attraction element; the anti-rotation slot is arranged between two adjacent attraction elements; and the lower base mounted directly below the upper base.

Further, the attraction element is a magnetic screw structure, comprising a screw head and a screw rod; the upper base is provided with a first screw hole, and the first screw hole is arranged correspondingly to the conductive substrate; an upper surface of the lower base is provided with a fastener, and the screw rod passes through the first screw hole and is screwed tightly with the screw rod by the fastener; the lighting device further comprises a wire, and a lower surface of the base is provided with a through hole; one end of the wire is electrically connected to a bottom of the screw rod, and the other end of the wire passes through the through hole and is electrically connected to the lamp body; the lighting device also comprises a nut and a gasket; one end of the connecting rod passes through the through hole and is fastened on the lower surface of the base by the nut; the lamp body is connected to the other end of the connecting rod.

Further, the base and the lamp body are provided integrally, or the base and the lamp body are connected by an adapter to form an integral structure.

At least one of the above technical solutions adopted in the examples of the present disclosure can achieve the following beneficial effects:

The magnetic conductive track and lighting fixture provided by the examples of the present disclosure use the conductive substrate with both conductive function and magnetic property, and the conductive and magnetic structures are integrated together, eliminating the use of the insulation strip and the iron component, the overall articles are fewer, the assembly process is simplified, and the cost is lower. Moreover, the visual detection can be facilitated by supplying the power to the conductive substrate at the lower part of two sides of the conductive track.

The above examples of the present disclosure focus on the differences between the various examples. As long as the different optimization features between the various examples do not contradict with each other, they can be combined to form a better example. Considering the simplicity of the text, it will not be repeated herein.

The present disclosure may include dedicated hardware implementations such as disclosure specific integrated circuits, programmable logic arrays and other hardware devices. The hardware implementations can be constructed to implement one or more of the methods described herein. Examples that may include the apparatus and systems of various implementations can broadly include a variety of electronic and computing systems. One or more examples described herein may implement functions using two or more specific interconnected hardware modules or devices with related control and data signals that can be communicated between and through the modules, or as portions of an application-specific integrated circuit. Accordingly, the system disclosed may encompass software, firmware, and hardware implementations. The terms “module,” “sub-module,” “circuit,” “sub-circuit,” “circuitry,” “sub-circuitry,” “unit,” or “sub-unit” may include memory (shared, dedicated, or group) that stores code or instructions that can be executed by one or more processors. The module refers herein may include one or more circuit with or without stored code or instructions. The module or circuit may include one or more components that are connected.

The above are only examples of the present disclosure and are not intended to limit the present disclosure. The present disclosure may have various changes and variations for those skilled in the art. Any modifications, equivalent substitutions, improvements, and the like made within the spirit and principles of the present disclosure are intended to be included in the scope of the present disclosure.

What is claimed is:

1. A magnetic conductive track for assembling on a mounting base and capable of forming a magnetic attraction and electrical connection with a lighting device, comprising:

a mounting main body comprising a mounting side and a connecting side arranged oppositely, the mounting side facing the mounting base and the connecting side facing the lighting device, wherein the mounting main body further comprises a convex rib arranged on the connecting side, wherein a holding space is formed by the convex rib along a lengthwise direction of the mounting main body;

a pair of conductive substrates arranged on the connecting side of the mounting main body, each conductive substrate comprising a magnetic layer, an insulating layer arranged on the magnetic layer, and a conductive layer arranged on the insulating layer, and wherein the magnetic layer faces the mounting side, the conductive layer faces the connecting side and is exposed outside for the lighting device to take power, and the magnetic layer is capable of being configured for attracting and connecting the lighting device; and a drive power source, wherein the drive power source is arranged within the holding space.

2. The magnetic conductive track according to claim 1, wherein each conductive substrate is flat and extends along the lengthwise direction of the mounting main body.

3. The magnetic conductive track according to claim 1, wherein the magnetic layer is an iron-based layer; and the conductive layer is a conductive copper foil.

4. The magnetic conductive track according to claim 1, wherein the mounting main body comprises:

a mounting wall located on the mounting side, configured for mounting the mounting main body on the mounting base;

a first connection slot and a second connection slot in parallel located below the mounting wall; and a first power-taking slot and a second power-taking slot in parallel located below and connected to the corresponding first connection slot and the second connection slot respectively, and the first power-taking slot and the second power-taking slot are located on the connecting side and are open to connect the lighting device, and wherein the pair of conductive substrates are respectively arranged in the corresponding first connection slot and the second connection slot, the magnetic layer faces the mounting wall, the conductive layer faces the first power-taking slot and the second power-taking slot respectively and is exposed in the first power-taking slot and the second power-taking slot.

5. The magnetic conductive track according to claim 4, wherein the mounting main body further comprises:

a first conductive track wall and a second conductive track wall arranged on the connecting side, and the first conductive track wall and the second conductive track wall are arranged on two sides of the convex rib, respectively;

the first connection slot is formed between the first conductive track wall and the convex rib; and the second connection slot is formed between the convex rib and the second conductive track wall;

the convex rib, the first conductive track wall, and the second conductive track wall are all vertically connected to a lower surface of the mounting wall;

the mounting wall, the convex rib, the first conductive track wall, and the second conductive track wall all extend along the lengthwise direction of the mounting main body;

the first connection slot, the second connection slot, the first power-taking slot, and the second power-taking slot are all parallel to the mounting wall;

a top surface of the mounting wall constitutes the mounting side;

a bottom surface of the convex rib, a bottom surface of the first conductive track wall, and a bottom surface of the second conductive track wall jointly constitutes the connecting side, the bottom surface of the convex rib is lower than the bottom surface of the first conductive track wall and the bottom surface of the second conductive track wall;

the mounting main body is in a convex shape; and a first space is formed for mounting a lamp body between the convex rib and the first conductive track wall; and a second space is formed for mounting a lamp body between the convex rib and the second conductive track wall.

6. The magnetic conductive track according to claim 4, wherein the mounting main body is formed with a socket at each end along the lengthwise direction of the mounting main body.

7. The magnetic conductive track according to claim 6, wherein the magnetic conductive track further comprises an electrical plug; the electrical plug is capable of being inserted into one of the sockets;
- the electrical plug comprises two conductive elastic pieces, and the conductive elastic piece can form an electrical connection with the corresponding conductive substrate in the corresponding first connection slot and the second connection slot;
- the electrical plug further comprises:
  - an extension portion accommodated in the socket; and
  - a head portion located outside the socket; the head portion is connected to the extension portion, wherein a width and a height of the head portion are respectively equal to a width and a height of the mounting main body, and a width and a height of the extension portion are both less than the width and the height of the head portion;
  - each conductive elastic piece comprises:
    - a first conductive segment clamped in the head portion; and
    - a second conductive segment vertically connected to one end of the first conductive segment towards the extension portion, and the second conductive segment protruding outside the head portion to form an elastic contact portion;
    - when the electrical plug is clamped in the socket, the elastic contact portion respectively enters the first connection slot and the second connection slot to form an electrical connection with the conductive substrate;
  - the electrical plug comprises:
    - an upper housing provided with an upper head portion; and
    - a lower housing provided with a lower head portion corresponding to the upper head portion and the extension portion; and
    - wherein the upper housing and the lower housing are assembled with each other, and the upper head portion and the lower head portion form the head portion; the conductive elastic piece is accommodated between the upper housing and the lower housing.

8. The magnetic conductive track according to claim 6, wherein a sealing plug is clamped in one of the sockets at one of the end of the mounting main body.

9. The magnetic conductive track according to claim 8, wherein the sealing plug comprises:
- an insertion portion accommodated in the one of the sockets at one of the end of the mounting main body; and
- a sealing head portion sealing outside the one of the sockets at one of the end of the mounting main body; the sealing head portion is connected to the insertion portion, wherein a width and a height of the sealing head portion are respectively equal to a width and a height of the mounting main body, and a width and a height of the insertion portion are both less than the width and the height of the sealing head portion.

10. A lighting fixture, wherein the lighting fixture comprises a magnetic conductive track, a lighting device; and wherein:
- the magnetic conductive track is for assembling on a mounting base and is capable of forming a magnetic attraction and electrical connection with a lighting device, and
- the magnetic conductive track comprises:
  - a mounting main body comprising a mounting side and a connecting side arranged oppositely, the mounting side facing the mounting base and the connecting side facing the lighting device, wherein the mounting main body further comprises a convex rib arranged on the connecting side, wherein a holding space is formed by the convex rib along a lengthwise direction of the mounting main body;
  - a pair of conductive substrates arranged on the connecting side of the mounting main body, each conductive substrate comprising a magnetic layer, an insulating layer arranged on the magnetic layer, and a conductive layer arranged on the insulating layer, and
  - wherein the magnetic layer faces the mounting side, the conductive layer faces the connecting side and is exposed outside for the lighting device to take power, and the magnetic layer is capable of being configured for attracting and connecting the lighting device;
  - a drive power source, wherein the drive power source is arranged within the holding space; and
- the magnetic conductive track is mechanically and electrically connected to the lighting device.

11. The lighting fixture according to claim 10, wherein the magnetic conductive track is configured to be assembled on the mounting base, the magnetic conductive track comprises a mounting side and a first connecting side arranged oppositely, the mounting side of the magnetic conductive track is served by a mounting side of the mounting main body of the magnetic conductive track, the first connecting side of the magnetic conductive track is served by a connecting side of the mounting main body of the magnetic conductive track; the first connecting side is provided with the convex rib, a first connection slot, and a second connection slot, and a pair of conductive substrates; wherein the first connection slot and the second connection slot are arranged on two sides of the convex rib, and each of the first connection slot and the second connection slot has an open end facing the lighting device and a closed end away from the lighting device; the convex rib protrudes toward the lighting device and beyond the open end of the first connection slot and the second connection slot; the pair of conductive substrates are respectively arranged in and exposed to the corresponding first connection slot and the second connection slot;
- the lighting device comprises a base with a lamp body side and a second connecting side arranged oppositely, wherein the second connecting side faces the first connecting side, and the second connecting side is provided with an anti-rotation slot and two attraction elements, the anti-rotation slot is recessed into the base, and the attraction elements are arranged on two sides of the anti-rotation slot and faces the first connecting side; and
- wherein the first connecting side and the second connecting side are abutted against each other, the convex rib extends into the anti-rotation slot, and the two attraction elements extend into the first connection slot and the second connection slot respectively and form a magnetic attraction with the conductive substrates.

12. The lighting fixture according to claim 11, wherein: the lighting device further comprises a lamp body, and the lamp body is connected to the lamp body side of the base by a connecting rod; and the base comprises:

an upper base provided with the anti-rotation slot and the attraction element; the anti-rotation slot is arranged between two adjacent attraction elements; and a lower base mounted directly below the upper base.

13. The lighting fixture according to claim 12, wherein: the attraction element is a magnetic screw structure, comprising a screw head and a screw rod;

the upper base is provided with a first screw hole, and the first screw hole is arranged correspondingly to the conductive substrate;

an upper surface of the lower base is provided with a fastener, and the screw rod passes through the first screw hole and is screwed tightly with the screw rod by the fastener;

the lighting device further comprises a wire, and a lower surface of the base is provided with a through hole; one end of the wire is electrically connected to a bottom of the screw rod, and the other end of the wire passes through the through hole and is electrically connected to the lamp body;

the lighting device also comprises a nut and a gasket; one end of the connecting rod passes through the through hole and is fastened on the lower surface of the base by the nut; the lamp body is connected to the other end of the connecting rod.

14. The lighting fixture according to claim 12, wherein the base and the lamp body are provided integrally, or the base and the lamp body are connected by an adapter to form an integral structure.

* * * * *